Patented Mar. 24, 1953

2,632,703

UNITED STATES PATENT OFFICE 2,632,703

LIGHT SENSITIVE DIAZOTYPE MATERIALS CONTAINING TETRAZO DIPHENYL COMPOUNDS

Sam Charles Slifkin, Binghamton, N. Y., assignor to General Aniline & Film Corporation, New York, N. Y., a corporation of Delaware No Drawing. Application December 30, 1948, Serial No. 68,398

7 Claims. (Cl. 95—7)

This invention relates to diazotype photo-reproduction media and more particularly to the use of certain tetrazo derivatives of aromatic amines having two diazotizable amino groups as the light sensitive element of the diazotype material.

The diazotype process, as is well known, involves the treating of a carrier or base, usually paper which may be either opaque or transparentized, or film of the cellulose ester or cellulose ether type, with a sensitizing composition containing a diazo compound as the light sensitive element. This treated base is exposed to actinic light through a pattern and a positive reproduction of the original obtained by development of the undecomposed diazo compound under the protected portions of the pattern, by means of alkaline coupling with an azo dye coupling component. The azo dye coupling component used for development of the image may be contained in an alkaline developing solution, as is the case in the so-called wet development or one-component process. In the dry development or two-component diazotype process, the sensitizing composition with which the base material is treated contains both the diazo compound and the azo coupling component. Here, the azo dye image is formed after exposure of the sensitized material by subjecting the exposed material to the action of alkaline vapors such as ammonia vapors. The diazotype photosensitive material for the two-component process must have good stability against precoupling, so that the sensitized layers may be stored for reasonable periods of time under average conditions of temperature and humidity prior to use.

The requirements of the diazotype art set rather rigid and exacting standards for the selection of the dye components to be used in the sensitizing composition for the production of a diazotype photoprinting material. The dye components must be capable of producing dyes which have good permanency and substantivity for the base material. The dyes upon development to produce the desired image must have good wash fastness properties so that the image will not be blurred by bleeding of the dye into the background. They must also be fast to light and to offset. The diazo compound used in the composition as the light sensitive agent must be highly sensitive to the action of actinic light and must be particularly responsive to light from a source rich in the ultraviolet light band of from 3600 Å. to 4200 Å. as are the light sources generally employed in the printing apparatus used for diazotype reproduction. The sensitivity to light of the diazo compound must be of such an order that complete decomposition of the diazo compound is effected in the areas exposed to light to a form or product which will no longer react with a coupling component to produce an azo dye and such action must take place in a short period of exposure. The shorter the period of exposure or the faster the diazo compound is to the action of light, the more suitable it is for commercial usage. In two-component processes the sensitizing materials must also be stable to precoupling or spontaneous coupling prior to use and against oxidation. Lack of stability to precoupling and oxidation results in an overall production of discoloration in the background of the ultimate print and consequent loss of contrast between the image and the background.

In all positive photo-printing processes, particularly where final copies are being made, it is highly desirable to produce a copy which will have a distinctive color preferably a dark shade on a clear background. The sensitivity of the diazo compound to actinic light, and in the case of two-component diazotypes, the stability of both the diazo compound and the azo component against precoupling are the principal contributing factors to the process of a clear background. Oxidation of the coupling component either before or after exposure and development and oxidation of the phenolic product or products of the diazo compound also contribute to the formation of discoloration in the background.

In view of the rigid standards to which the components used in diazotypes must comply, relatively few classifications of diazo compounds have found their way into commercial usage. For all practical purposes those diazo compounds which are used commercially have been selected from the diazo derivatives of amino-naphthol sulfonic acids or so-called diazo anhydrides and the N-alkyl substituted paraphenylene diamines of the benzene series. Many others have been tried but few, if any, have achieved commercial acceptance. Little attention has been given to tetrazo derivatives of diazotizable diamines and although some have been mentioned in the literature it has been found in practice that most of the tetrazo compounds have characteristic defects which limit their use in diazotype formulations. The tetrazo compounds generally are of low sensitivity to light and hence, require slow printing speeds. Their coupling potential or rate of reaction with coupling components is generally very fast rendering it difficult to secure sensitized two-component compositions having good keeping quality in the unprocessed form. Also, the shades produced by tetrazo compounds with most coupling components suitable for diazotype work are in the red range, while the most desirable shades for diazotype work are dark shades and particularly dark blues.

I have now found a type of compound which is tetrazotized, but has similar structural characteristics to the paraphenylene diamines principally used in diazotype work. This new class of compounds may be considered as derived by diazotization from members of the class of amines which may be represented by the following general formula:

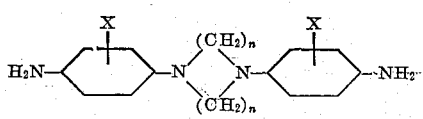

wherein the X's represent substituent groups particularly alkyl, such as methyl, ethyl and propyl or alkoxy, such as methoxy and ethoxy groups and $n$ represents a whole number not greater than 3. Typical of this class of compounds is N,N'-bis(4-amino phenyl)piperazine. This compound can be prepared by the condensation of two mols of ethylene di-bromide with two mols of paranitroaniline followed by reduction of the nitro groups to amino groups. Similarly if other alkaline dihalides are condensed with the substituted paranitroanilines, such as methylenedibromide and propylenedibromide, similar diamino compounds which are suitable for diazotization may be produced. Further examples of particular bis-diamino compounds of this class which may be thus prepared are as follows:

1. N,N'-bis[4-aminophenyl]dimethylene diamine

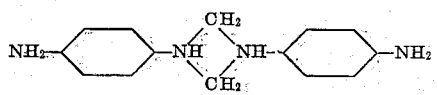

2. N,N'-bis[4-aminophenyl]piperazine

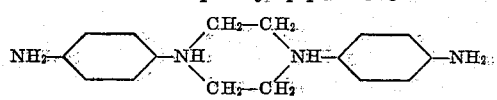

3. β-Naphthol-3,6-disulfonic acid zine

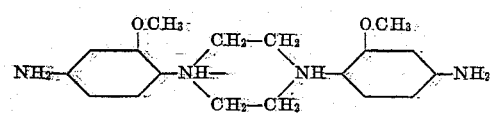

4. N,N'-bis[p-amino-2-methyl-phenyl]piperazine

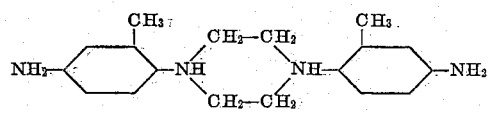

5. N,N'-bis[4-amino phenyl]bis-trimethylene diamine

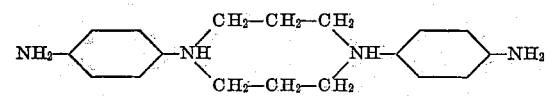

6. N,N'-bis[p-amino-2-methyl-phenyl]bis-trimethylene diamine

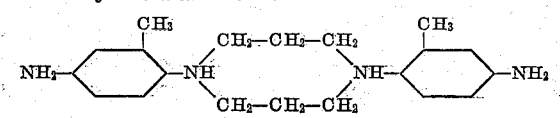

7. N,N'-bis[p-amino-3-ethoxy-phenyl]bis-trimethylene diamine

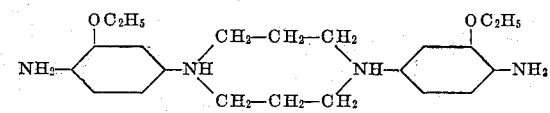

The tetrazo compounds derived from this class of amines by tetrazotization are extremely light sensitive and in fact their sensitivity is found to be in the range of that for some simple diazo compounds such as p-diazo-N-diethylaniline. The shades which may be obtained by coupling with the usual coupling components employed in diazotype compositions are similar to those obtained from the same coupling components combined with such diazo compounds as p-diazo-N-methyl or N-ethyl aniline. Their coupling energy is also similar to these simpler diazo derivatives, but the wash fastness properties of the resulting dyes is considerably improved. The dyes are more substantive to the material used for the base such as paper and cellulosic films and do not bleed or offset. The light fastness of the dyes produced from these tetrazo compounds is also very satisfactory.

The tetrazo compounds derived from the amines of the foregoing class may be applied in the usual manner to any suitable support such as paper, cloth or film, such as film prepared from cellulose ethers and esters, regenerated cellulose, superpolymers and polymerization products. They may be used in any of the stabilized forms in which diazo compounds are generally recovered from the diazotization solutions prior to application to the diazotype supports. Such forms include zinc chloride, cadmium chloride, tin chloride or fluoroborate double salts, acid salts such as sulfates or chlorides of the diazo groups or the alkyl or aromatic sulfonate salts of the diazo compounds. Any compound which will function as a coupling agent and which is otherwise suitable for diazotype compositions may be employed to produce the desired shade. The coupling component may be either incorporated in the coating composition to be applied to the diazotype support with the tetrazo compound as a so-called two-component system or it may be used in a developing solution as the color forming developer for a so-called one-component or wet development diazotype. Examples of preferred coupling components are:

1. Sodium salt of 2-amino-8-naphthol-3,6-disulfonic acid
2. 2,3-dihydroxynaphthalene or its 6-sulfonic acid derivative
3. β-Naphthol-3,6-disulfonic acid
4. 2,7-dihydroxy naphthalene
5. 1,7-aminonaphthol
6. 2-hydroxynaphthalene-8-biguanide
7. 1-amino-8-naphthol-3,6-disulfonic acid
8. 1-naphthol-4-sulfonic acid
9. 1-naphthol-3,8-disulfonic acid
10. Phloroglucinol
11. m-Hydroxyphenyl urea
12. Acetoacetanilide
13. 7-hydroxy-1,2-naphthimidazole
14. Cyclohexyl acetoacetamide
15. Resorcinol
16. 4,6-dichlororesorcinol
17. 3-hydroxyphenyl biguanide
18. 4-chlororesorcinol
19. 2,8-dihydroxynaphthalene-6-sulfonic acid In producing a diazotype light sensitive layer from coating solutions containing the tetrazo compounds of this invention as the light sensitive agents, the base or support material is dipped, brushed or sprayed with the sensitizing or coating solution by means known to the art, the particular type of application depending upon the carrier employed. Where paper is used as the base for the light sensitive coating, the coating solution is generally applied by using a trough and doctor blade, the paper being drawn past the trough and excess solution being scraped off with the doctor blade. The paper may also be brushed or sprayed with the coating solution. When a film material is used as the support in order to obtain proper penetration of the active agents, solvents or swelling agents are added to the coating solution and the solution is generally applied by dipping. In addition to the tetrazo compound, coupling component and impregnating and swelling solvents, the coating solution may also contain dissolved metal salts designed to intensify the dyestuff images, such as aluminum sulfate, titanium ammonium fluoride, nickel sulfate and the like, stabilizing agents such as thiourea, thiosinamine, naphthalene trisulfonic acid and the like, acids to effect complete solubility of the solid components and assist in retarding precoupling tendencies such as citric acid, tartaric acid and boric acid and hygroscopic agents such as glycol, dextrin and the like.

Although this invention will be described with reference to the two-component or so-called dry development process, i. e., development of a diazotype layer containing both the tetrazo and coupling component by contacting the exposed diazotype with ammonia vapor or vapors of other volatile alkaline materials, nevertheless the invention is also applicable to the so-called one-component or moist development process in accordance with which the solution applied to the support contains as the only dye component the tetrazo compound of the class set forth above. In this process as previously indicated, the coated support is exposed and the tetrazo compound decomposed in the exposed areas in the same manner as in the case of the two-component system, but the unexposed areas are developed by contacting the light exposed diazotype with a solution of alkaline agents containing the coupling component.

The following examples will serve to further illustrate the preparation of diazotype photoprinting materials from the tetrazo compounds of this invention, it being understood that the invention is not limited to the particular materials or proportions therein described. Unless otherwise specified, the parts are by weight.

*Example 1*

Diazotype paper stock is coated with a solution containing the following material per 100 cc. of water:

2 gs. p,p' tetrazo diphenyl piperazine $ZnCl_2$ double salt
5 gs. 2,3-dihydroxynaphthalene-6-sulfonic acid
5 gs. zinc chloride
5 gs. thiourea
5 gs. citric acid
5 cc. ethyleneglycol The thus coated paper upon being dried and stored for long periods of time is found to have excellent precoupling stability. When exposed to ultraviolet light under a positive original and developed with ammonia vapors a well defined image of the original is reproduced in a dark blue color. The wash fastness, fastness to offset and light fastness of this image are excellent.

*Example 2*

Diazotype paper stock is coated with a solution containing the following material per 100 cc. of water:

2 gs. p,p' tetrazo diphenyl piperazine $ZnCl_2$ double salt
1 g. phenylmethyl pyrazolone
5 gs. zinc chloride
2 gs. boric acid
5 gs. thiourea
5 gs. citric acid
5 cc. ethyleneglycol The thus coated paper upon being dried and stored for long periods of time is found to have excellent precoupling stability. When exposed to ultraviolet light under a positive original and developed with ammonia vapors a well defined image of the original is reproduced in a brilliant red shade. This image has excellent wash fastness, fastness to offset and light fastness properties.

I claim:

1. A light sensitive material for use in the production of diazotype prints comprising a flat carrier base having thereon a light sensitive layer containing a tetrazo derivative of an aromatic diamine having the general formula:

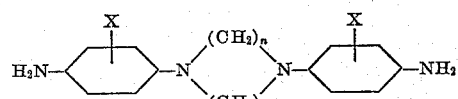

wherein X is a member of the group consisting of hydrogen, alkyl and alkoxy and $n$ is a whole number not greater than 3.

2. A light sensitive material for use in the production of diazotype prints comprising a flat carrier base having thereon a light sensitive layer containing a tetrazo derivative of an aromatic diamine having the general formula:

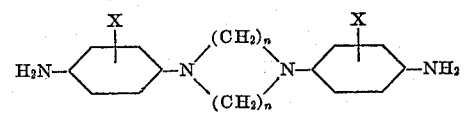

wherein X is a member of the group consisting of hydrogen, alkyl and alkoxy and $n$ is a whole number not greater than 3 and an azo dye coupling component.

3. A light sensitive material for use in the production of diazotype prints comprising a flat carrier base having thereon a light sensitive layer containing a tetrazo derivative of N.N'bis[4-aminophenyl]piperazin having the formula:

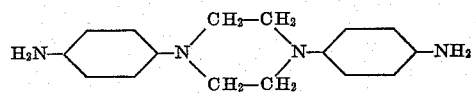

and an azo dye coupling component.

4. A light sensitive material for use in the production of diazotype prints comprising a flat carrier base having thereon a light sensitive layer containing a tetrazo derivative of N.N'bis[4-aminophenyl]piperazin having the formula:

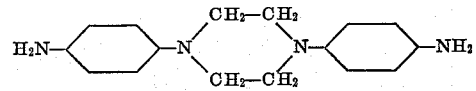

and 2,3-dihydroxynaphthalene-6-sulfonic acid.

5. A light sensitive material for use in the production of diazotype prints comprising a flat carrier base having thereon a light sensitive layer containing a tetrazo derivative of N.N'bis[4-aminophenyl]piperazin having the formula:

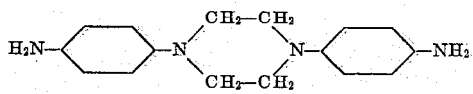

and phenyl methyl pyrazolone.

6. The process of producing azo dye images in a light sensitive diazotype material comprising a flat carrier base having thereon a light sensitive layer containing a tetrazo derivative of an aromatic diamine having the general formula:

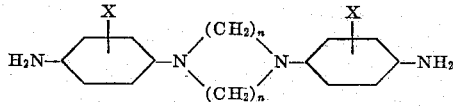

wherein X is a member of the group consisting of hydrogen, alkyl and alkoxy, and $n$ is a whole number not greater than 3, which comprises exposing said base under a pattern to destroy said tetrazo derivative where it is exposed to light, and converting the residual tetrazo derivative to an azo dye by coupling the same with an azo dye coupling component in the presence of an alkali.

7. The process as defined in claim 6, wherein said light sensitive diazotype material also contains an azo dye coupling component.

SAM CHARLES SLIFKIN.

REFERENCES CITED

The following references are of record in the file of this patent:

UNITED STATES PATENTS

| Number | Name | Date |
|---|---|---|
| 2,196,950 | Zohn et al. | Apr. 9, 1940 |
| 2,531,485 | Von Glahn et al. | Nov. 28, 1950 |

FOREIGN PATENTS

| Number | Country | Date |
|---|---|---|
| 332,954 | Great Britain | July 29, 1930 |
| 538,869 | Great Britain | Aug. 20, 1941 |

OTHER REFERENCES

Spencer, "Photographic Applications of Diazo Compounds," The Photographic Journal, Dec. 1928, pp. 490 to 494, page 492 particularly cited.